United States Patent [19]
Danielson et al.

[11] Patent Number: 5,497,057
[45] Date of Patent: Mar. 5, 1996

[54] MECHANICAL BRAKE HOLD CIRCUIT FOR AN ELECTRIC MOTOR

[75] Inventors: Craig T. Danielson, Tucson; Gregory T. Kishi, Oro Valley; Michael P. McIntosh, Tucson; Hector E. Mery, Tucson; Scott M. Rockwell, Tucson, all of Ariz.

[73] Assignee: International Business Machines Corporation, Armonk, N.Y.

[21] Appl. No.: 331,446

[22] Filed: Oct. 31, 1994

Related U.S. Application Data

[62] Division of Ser. No. 28,066, Mar. 8, 1993, Pat. No. 5,394,069.

[51] Int. Cl.$^6$ ............................. H02P 3/26; G11B 17/22
[52] U.S. Cl. ............................................. 318/371; 369/34
[58] Field of Search ................................. 414/273, 277, 414/280; 369/24, 30, 32, 33, 34, 35; 318/362, 372, 373, 375, 379, 380

[56] References Cited

U.S. PATENT DOCUMENTS

| | | |
|---|---|---|
| 1,411,987 | 4/1922 | Clough . |
| 1,684,247 | 9/1928 | Schiebeler . |
| 2,656,501 | 10/1953 | Cotter . |
| 2,666,176 | 1/1954 | Fath . |
| 3,153,182 | 10/1964 | Choudhury . |
| 3,486,097 | 12/1969 | Shekro . |
| 3,920,195 | 11/1975 | Sills et al. . |
| 4,417,288 | 11/1983 | Hattori et al. . |
| 4,426,606 | 1/1984 | Suita et al. . |
| 4,494,058 | 1/1985 | Berti . |
| 4,787,074 | 11/1988 | Deck et al. . |
| 4,846,619 | 7/1989 | Crabtree et al. . |
| 4,989,191 | 1/1991 | Kuo . |

*Primary Examiner*—Bentsu Ro
*Attorney, Agent, or Firm*—M. W. Schecter

[57] ABSTRACT

An automated tape library employing a motorized robotic picker wherein the electric motor driving the robotic picker is equipped with two brakes that act simultaneously. The first is a mechanical brake which uses a spring to push a brake pad against the rotating motor. During normal motor operation, an electric solenoid is used to overcome the spring and disengage the brake pad from the motor. When the robotic picker is to be mechanically stopped, the solenoid voltage is turned off and the solenoid releases the spring placing the brake pad in contact with the motor. The second brake is a dynamic electrical brake which makes use of the back emf of the motor to drive a current back into its own windings such that the motor decelerates.

11 Claims, 3 Drawing Sheets

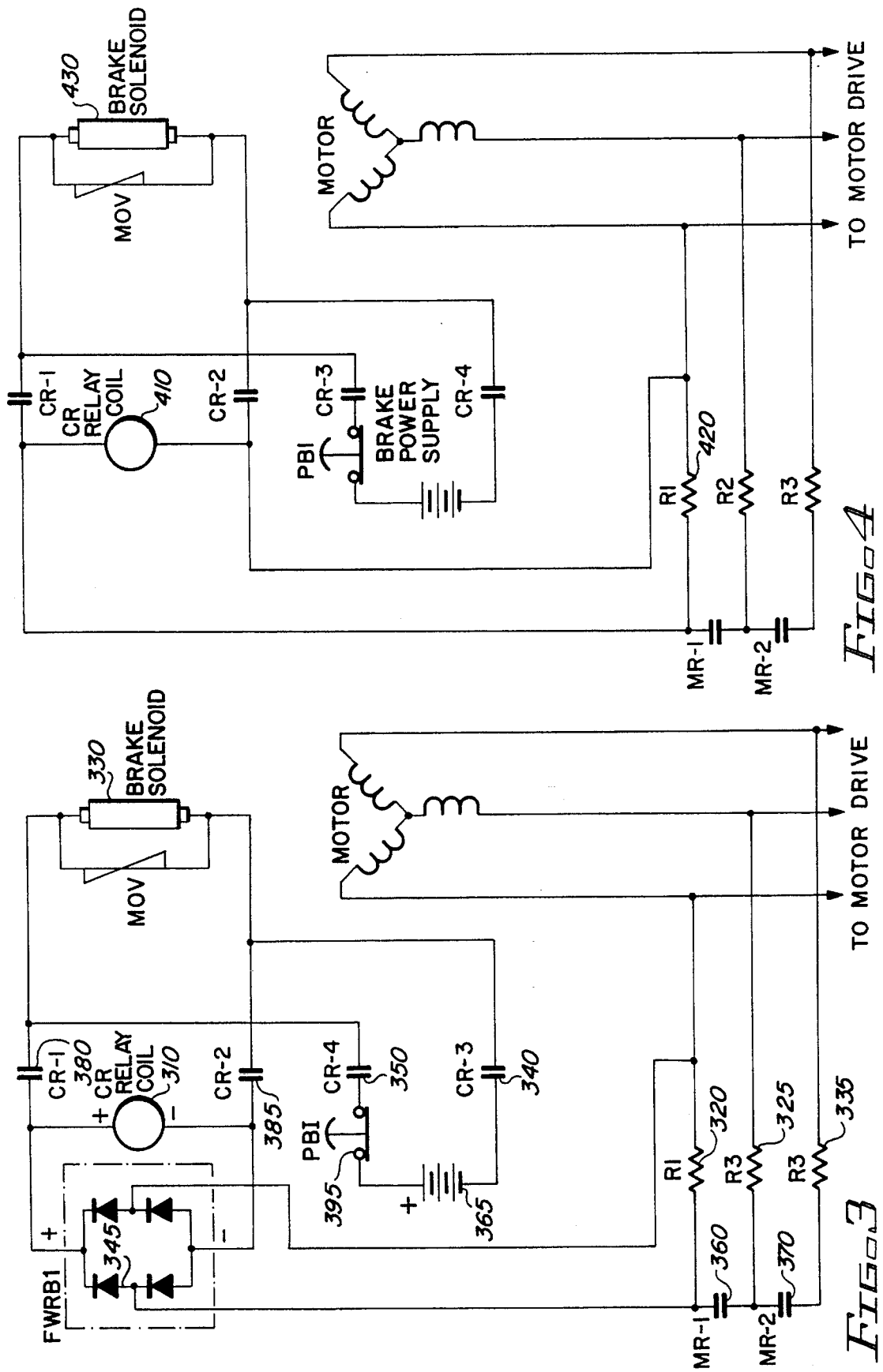

MECHANICAL BRAKE HOLD CIRCUIT FOR AN ELECTRIC MOTOR

This application is a divisional of application Ser. No. 08/028,066, filed Mar. 8, 1993, now U.S. Pat. No. 5,394,069.

BACKGROUND OF THE INVENTION

1. Field of the Invention

The present invention relates generally to automated storage libraries and specifically to a method and apparatus for slowing and stopping a robotic picker associated with such a library.

2. Description of the Prior Art

Many business and technical applications require very large databases for storing information used in connection with the applications. Database storage requirements can exceed hundreds or thousands of gigabytes of data. Often these storage requirements can not be met by disk drive storage due to cost and/or physical space limitations. Data storage for such large databases are typically stored on magnetic tape which provides the lowest storage cost per unit of data.

Tape storage, however, generally requires the longest access time among existing technologies for retrieving the stored data. There are two primary reasons for this. First, once a tape is loaded into a tape drive, accessing the data stored on the tape is substantially slower than accessing data stored on devices such as a direct access storage device (DASD) or an optical disk. This is primarily due to the respective transport speeds of the data containing medium as well as the bandwidth attainable by the read heads present in the respective storage devices. Secondly, the time required to locate the desired tape and transport it to the tape drive for loading can bring about substantial delays. Depending on the size of the database, the totality of data can often be stored on DASD devices which do not require transport back and forth to the read head as with tape libraries.

Early magnetic tape databases required an operator, when prompted, to retrieve a tape from a shelf and load the tape into a tape drive. This procedure was not only time consuming but was also prone to human operator errors. Automated storage libraries such as that disclosed in U.S. Pat. No. 5,015,139 have been developed to overcome the delays associated with loading and unloading tapes. In addition, automated storage libraries eliminate the above described human operator errors associated with handling the tapes.

The ability to place larger amounts of data on tape has derived principally from two technological advancements. First, actual cartridge size has been diminished as a result of various mechanical advances. Secondly, media properties have been improved to store more data on a given area of tape. Data can currently be written to eighteen tracks or more. It can be thus be seen that with the improvements in physical size and media technologies that have taken place over the years, it has become possible to pack more and more data into a smaller and smaller storage element such a tape cartridge. These advances in magnetic tape technology have made automated tape libraries more appealing in recent years.

Access time and reliability is improved in an automated tape library by automatically managing the storage and retrieval of tape cartridges. Operational benefits of using an automated tape library include greater reliability in tape cartridge mounts, better predictability in request-to-mount mount time and improved off-shift availability. Automated tape libraries include a large number of storage slots for storing library resident tape cartridges as well as one or more tape drives connected to the data processing system. They also include a robotic picker mechanism. In some cases an input/output port is provided to allow for the insertion and removal of cartridges to and from the library. The robotic picker operates on command from the processing system to transfer a tape cartridge between a storage slot and a tape drive within seconds. In some cases it may also move a cartridge from one storage slot to another.

The robotic picker typically includes either an accessor with a picker mechanism or a sled with a robotic arm having a vision system and a gripper system. The vision system can view a label or bar code attached to a tape cartridge in order to identify the correct cartridge to be picked. The vision system may also provide feedback to the gripper system so that the gripper system can move to the correct position in order to pick the designated tape cartridge. It will be understood by one of ordinary skill in this art that such a robotic picker can be configured to access and transport a variety of data elements, tape cartridges being only one such element. As such, it will be realized that the novel aspects of this invention can be applied in any sort of automated storage library, the automated tape library being only one possible application.

In the automated tape library, the robotic picker is moved through long distances on a track which establishes a path of conveyance between the tape cartridge library and one or more tape drive units. The robotic picker is driven by a large electric motor. To accomplish the required movement, the electric motor is used to drive a gear transmission which in turn drives a metal pinion gear against a plastic coated rack gear. During normal usage, the acceleration and deceleration of the motor is controlled by an AC servo motor controller. In the event of a power failure or emergency situation, the motor may also be stopped through the use of a mechanical brake that engages automatically to stop the rotation of the motor. The translational motion of the robotic picker is stopped by forces acting between the moving pinion gear and the stationary rack.

If the combination of braking forces applied to the motor are too strong, the forces between the pinion and rack become so high that gear teeth in the rack can be broken or damaged. In the case of an emergency stop it is very important to bring the robotic picker to a complete stop in as short a time period as possible. It is, however, unacceptable to provide this feature at the cost of broken teeth.

SUMMARY OF THE INVENTION

Accordingly, it is an object of the present invention to provide an improved method and apparatus for storing and retrieving large amounts of data.

It is a further object of this invention to provide an automated storage library which includes a robotic picker for accessing a selected data element and loading it into a drive.

It is a still further object of this invention to provide an automated storage library employing a robotic picker that can be quickly slowed down and/or stopped.

It is a yet further object of this invention to provide the ability to stop and/or slow the robotic picker without causing damage to the rack and pinion system on which the robotic picker rides.

In the automated tape library of this invention, the electric motor driving the robotic picker is equipped with two brakes that act simultaneously. The first is a mechanical brake which uses a spring to push a brake pad against the rotating motor. During normal motor operation, an electric solenoid is used to overcome the spring and disengage the brake pad from the motor. When the robotic picker is to be mechanically stopped, the solenoid voltage, is turned off and the solenoid releases the spring placing the brake and in contact with the motor. The second brake is a dynamic electrical brake which makes use of the back emf, or generator action, of the motor to drive a current back into its own windings such that the motor decelerates.

The dynamic electrical braking force diminishes as the motor speed drops and can be precisely controlled by placing resistors in series with the motor windings. The mechanical braking force is controlled by the spring force and the state of wear of the brake pad. In practice, mechanical braking forces can vary widely and often are so high that it causes damage to the gear teeth when the brakes are applied to a robotic picker moving at or close to full speed.

It is important to note, however, that it is not possible to simply use dynamic braking in all situations. This is because at slow speeds or in a stationary position, there is little or no back emf to drive the dynamic electrical brake. As a result, at these speeds, the mechanical brake must be used.

According to the invention, fast braking without damage to the drive system is accomplished by supplying part of the motor back-emf energy to the mechanical brake solenoid, which in turn prevents the mechanical brake from engaging while the robotic picker is moving at high speeds. In this way, only the well controlled and relatively gentle dynamic braking force is used to slow down the robotic picker and, thus, damage to the gear teeth is prevented. When the motor speed drops sufficiently the back-emf is no longer high enough to provide much braking action or hold the mechanical brake solenoid. At this point the mechanical brake is engaged and completes the task of halting robotic picker movement. Further, the engagement of the mechanical brake holds the robotic picker firmly in the stopped position.

BRIEF DESCRIPTION OF THE DRAWINGS

The above and further objects, features and advantages of the present invention will become more apparent from the following detailed description taken in conjunction with the accompanying drawings, wherein:

FIG. 3 is a schematic diagram illustrating a first preferred embodiment of the dynamic brake circuit embodied in the present invention.

FIG. 4 is a schematic diagram illustrating a second preferred embodiment of the dynamic brake circuit embodied in the present invention.

DESCRIPTION OF THE PREFERRED EMBODIMENTS OF THE INVENTION

For purposes of illustration, the invention is described in the context of an automated tape library such as the IBM 3495 Tape Library Dataserver. However, the subsequent teachings could be applied in any number of other applications where there exists a need to stop a load driven by an electric motor in a controlled manner.

Figure 1:
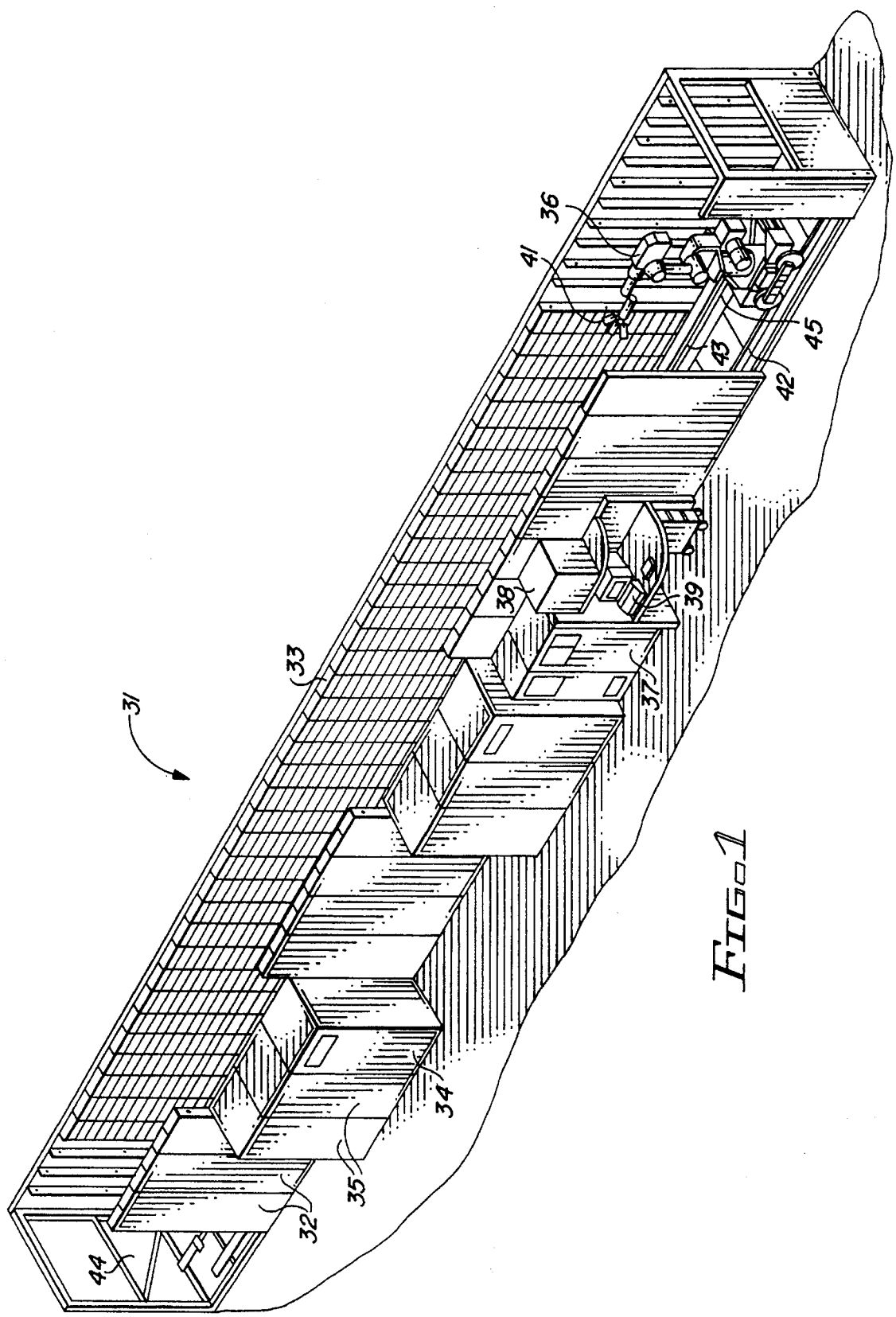
FIG. 1 is a perspective view of the automated tape library which embodies the preferred embodiment of the invention described herein.

Referring now to FIG. 1, the IBM 3495 automated tape library is shown in perspective view. The automated tape library 31 is able to manage a very large database by storing data on a large number of magnetic tapes. Each magnetic tape is housed in a plastic cartridge for protecting the magnetic tape and providing a convenient handling mechanism for a robotic picker. The automatic tape library 31 includes a plurality of modules 32, wherein each module is made from a plurality of magazine holders (not shown). Each magazine holder consists of a plurality of storage slots 33, with each storage slot being capable of storing a magnetic tape cartridge therein.

The automatic tape library 31 also includes at least one tape unit, for example, an IBM 3490 Magnetic Tape Subsystem having a controller 34 and tape drives 35. A sled 52 with a robot 36 (hereinafter denoted "robotic picker 10", having a gripper/vision assembly 41 attached thereto, travels on an outrigger rail 42 and a guide rail 45 to transfer tape cartridges between the storage slots 33 and the tape drives 35. The robot 36 is capable of human-like motions. A example of a robot suitable for the purposes described herein is the Model GMF S-10 robot, manufactured by Fanuc, Ltd.

A robotic picker controller 37, attached to the automatic cartridge library 31, commands the sled 52 with robot 36. A service bay 43, for the robot 36, is located at one end of the automated tape library 31. The service bay 43 functions as a parking space for the sled 52 with robot 36 when it is not in use or when it is being serviced. An operator access bay 44 is provided at the other end of the automated tape library 31 in order to allow service personnel to enter the chamber. A remote terminal bay 38, accessible internally by a service person, is attached to the automated tap library 31. Library management is available through a personal computer 39. The personal computer 39 allows an operator to determine system status, promote a tape cartridge mount status or to generally enter instructions to the automated tape library 31.

Figure 2:
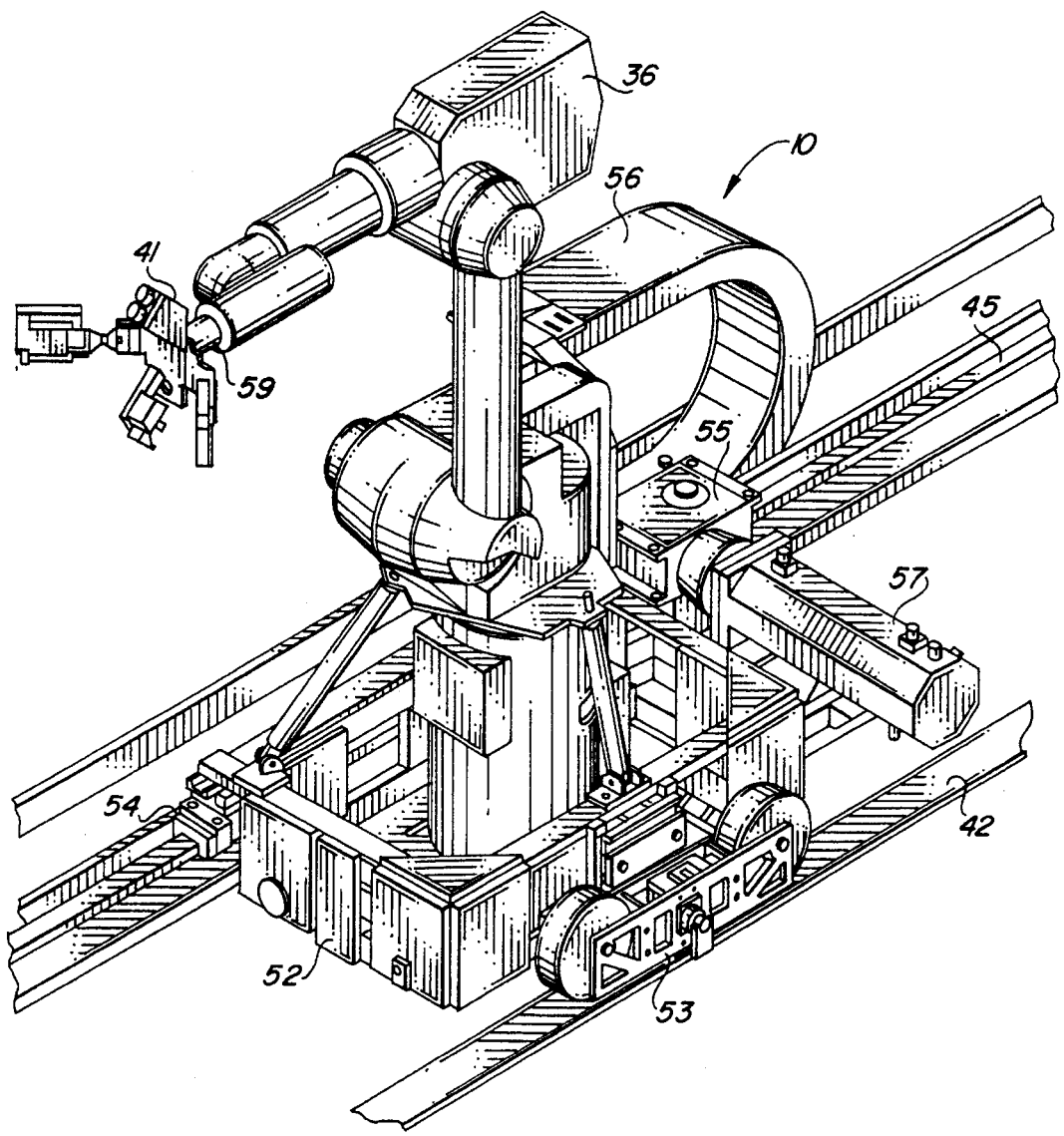
FIG. 2 is a detailed view of a robotic picker used in the automated tape library of FIG. 1.

FIG. 2 shows the sled 52 with robot 36 in greater detail. The robot sled 52 is supported by an outrigger assembly 53 which includes two wheels for riding on the outrigger rail 42. The outrigger rail 42 provides no guidance or control; it merely supports the sled 52. A linear bearing assembly 54 includes a drive pinion which engages teeth on a gear rack (not shown) below the guide rail 45 for guiding the sled 52. A servo motor 57 provides the drive necessary to move the sled 52 along the guide rail 45. The Model 30S-3000 AC servo motor manufactured by Fanuc, Ltd. is a suitable model for the embodiment of the invention described herein. It should be noted, however, that various motor configurations could just as easily be embodied in the subject invention.

The servo motor 57 does not drive tile sled 52 directly, but instead the servo motor 57 is connected to a reducer 55. The reducer 55 is a right angle gear box for reducing the speed and changing the axis of the servo motor 57. The reducer 55 increases the servo motor 57 torque for moving the robot 36. Textron manufactures a Model SMV-25 reducer that provides the necessary functions.

The position of sled 52 may be accurately tracked by an optical encoder (not shown). The gripper/vision assembly 41 is shown attached to an end of an arm 59 of the robot 36. The arm 59 rotates to turn the gripper/vision assembly 41 to different positions. Power and signal lines are connected to the robot 35 via a cable chain 56. The cable chain 56 provides protection for the cables and is flexible to allow the cables to follow the robotic picker 10.

The sled 52 and robot 36 may be stopped in the event of a power failure or in the event of an emergency stop situation. An emergency stop situation occurs when an emergency stop button is depressed by a human operator in the event of a dangerous or unexpected situation. When the emergency stop button is depressed, all power is immediately blocked from reaching the robotic picker 10. While the following discussion addresses a single emergency stop button, it will be recognized that there could exist a plurality of such stop buttons with a minimal amount of modification and that such modification would be within the spirit and scope of this invention.

Turning now to FIG. 3, the circuit of the current invention is described. It can be seen that normal motor operation (i.e. in the absence of braking or emergency stop) is maintained in this circuit by energizing the mechanical brake solenoid 330 so as to retract the associated mechanical brake (not shown). The mechanical brake operates by pushing a fixed brake pad against the rotating motor. The position of the brake pad is determined by an attached spring which is positioned according to the state of the mechanical brake solenoid 330. The dynamic braking action is not active during normal motor operation since there is no current path through the dynamic brake resistors 320, 325 and 335.

A constant voltage is supplied to mechanical brake solenoid 330 so that the mechanical brake pad (not shown) is not engaged and no mechanical braking force is generated. The voltage is supplied through the normally closed contact poles $CR_3$ 340 and $CR_4$ 350 of relay CR 310. Also, during normal motor operation, motor relay MR (coil not shown) is energized so that relay contacts $MR_1$ 360 and $MR_2$ 370 are open.

When an emergency stop condition occurs such as in the case when push button 395 is depressed, motor relay MR deenergizes and contacts $MR_1$ 360 and $MR_2$ 370 close so that the motor windings are shorted through dynamic brake resistors $R_1$ 320, $R_2$ 325 and $R_3$ 335. The AC current flowing through the brake resistors produces a voltage across all three resistors. The voltage across $R_1$ 320 is tapped with rectifier bridge 345. The rectified output voltage is supplied to the coil of control relay CR 310 and to the pair of normally open contacts $CR_1$ 380 and $CR_2$ 385.

This causes contacts $CR_1$ 380 and $CR_2$ 385 to close which in turn supplies the rectified voltage to mechanical brake solenoid 330, thus preventing it from collapsing and engaging the mechanical brake. Furthermore, as control relay CR 310 energizes, the connection to the normal brake controls is broken because normally closed contacts $CR_3$ 340 and $CR_4$ 350 are opened.

As the motor decelerates, the current through the windings drops and eventually the voltage across $R_1$ 320 will no longer be sufficient to hold mechanical brake solenoid 330 and/or control relay CR 310 open. In either case, mechanical brake solenoid 330 will collapse and the mechanical brake will engage, bringing the motor to a complete stop. At this time there is no current in the windings and no voltage across $R_1$ 320. This causes control relay CR 310 to be forced into its de-energized state. As a result, control of mechanical brake solenoid 330 is returned to the normal mechanical brake circuit, motor rotation is halted and the robotic picker 10 is locked in the stationary position.

FIG. 4 shows a second preferred embodiment of the current invention in an AC configuration. In this embodiment a rectifier bridge is not needed. Instead, the voltage across $R_1$ 420 is tapped directly into relay CR 410. Relay CR 410 is an AC relay. Also, brake solenoid 430 is selected for AC operation.

It can be seen from the above description of the braking circuit of this invention, that the peak (and most destructive) braking forces incident to the automatic tape library robotic picker movement can be limited and precisely controlled by using only the dynamic electrical brake force when the robotic picker 10 is moving fast. The braking force can be controlled by adjusting the resistance values of resistors $R_1$ 320, $R_2$ 325 and $R_3$ 335. The mechanical brake force, which is not well controlled and can be damaging at high speeds, is employed only at low speeds. This prevents the high forces that can cause damage in the mechanical system, but applies braking action even when the robotic picker is stopped or completely powered off.

It should also be noted that because the system embodying the current invention uses self generated power to perform braking, damage is prevented even when the emergency happens to be a power failure that occurs while the robotic picker is in motion. Further, the system of the current invention is single fault tolerant. The robotic picker will stop at a safe distance even when there is a single fault in one of the components. This includes any of the dynamic brake resistors $R_1$ 320, $R_2$ 325 and $R_3$ 335, the rectifier bridge 345, control relay CR 310 or the connecting wires. While mechanical damage due to overly severe braking could occur in the event of a failure, the circuit will still function properly with regard to braking ability.

While the invention has been described in its preferred embodiments, it is to be understood that the words which have been used are words of description rather than limitation and that changes within the purview of the appended claims may be made without departing from the true scope and spirit of the invention in its broader aspects.

Having thus described the invention, what is claimed as new and what is desired to be secured by Letters Patent is:

1. An automated storage library comprising:
   a plurality of storage slots, each arranged to accept and store a data storage element;
   one or more data drives arranged to read and write data from and to said data storage elements; and a robotic picker mechanism for transferring said data storage elements between said plurality of storage slots and said one or more data drives, said robotic picker mechanism including an electric motor and a braking control, said electric motor further including motor windings, a mechanical brake and a dynamic electrical brake, said braking control including resistors in series with the motor windings, said braking control activating said dynamic electrical brake and disabling said mechanical brake at or above a predetermined motor speed, said braking control including:
   a mechanical brake power supply;
   a brake solenoid; and
   a relay having a plurality of contacts, each of said contacts connected between said brake solenoid and at least one of said relay and said brake power supply.

2. The automated storage library of claim 1 wherein said braking control directs motor back-emf to disable said mechanical brake at or above a predetermined motor speed.

3. The automated storage library of claim 1 wherein said mechanical brake is operated by said brake solenoid such that said brake solenoid selectively places a fixed brake pad in contact with said motor.

4. An automated storage library comprising:
   a plurality of storage slots, each arranged to accept and store a data storage element;
   one or more data drives arranged to read and write data from and to said data storage elements; and a robotic picker mechanism for transferring said data storage elements between said plurality of storage slots and said one or more data drives, said robotic picker mechanism including an electric motor and a braking control, said electric motor further including a mechanical brake and a dynamic electrical brake, said braking control activating said dynamic electrical brake and disabling said mechanical brake at or above a predetermined motor speed, said braking control including:

a mechanical brake power supply having first and second terminals;

a first relay having first, second, third and fourth movable contacts and a coil, said coil having first and second terminals;

a brake solenoid having first and second terminals;

said first movable contact of said first relay being connected between said first terminal of said coil of said first relay and said first terminal of said brake solenoid;

said second movable contact of said first relay being connected between said second terminal of said coil of said first relay and said second terminal of said brake solenoid;

said third movable contact of said first relay being connected between said second terminal of said brake solenoid and said first terminal of said brake power supply;

said fourth movable contact of said first relay being connected between said first terminal of said brake solenoid and said second terminal of said brake power supply; and a first resistor having a first and second terminal and being connected to a conversion means and being further connected to said electric motor, and said conversion means being connected to said first relay.

5. The automated storage library of claim 4 wherein said conversion means converts a voltage source from alternating current to direct current.

6. The automated storage library of claim 5 wherein said conversion means is a rectifier bridge.

7. The automated storage library of claim 4 further including:

a second resistor having a first terminal connected to said first terminal of said first resistor and a second terminal connected to said electric motor;

a third resistor having a first terminal connected to said first terminal of said second resistor and a second terminal connected to said electric motor.

8. The automated storage library of claim 7 further including a second relay having first and second movable contacts and a coil, said first movable contact connected between said first terminal of said first resistor and said first terminal of said second resistor and said second movable contact connected between said first terminal of said second resistor and said first terminal of said third resistor.

9. The automated storage library of claim 4 wherein said electric motor is an AC motor.

10. The automated storage library of claim 4 wherein said electric motor is a DC motor.

11. The automated storage library of claim 4 wherein said mechanical brake power supply is disconnected from the circuit when an emergency power off button is depressed.

* * * * *